United States Patent [19]
Son

[11] Patent Number: 5,193,212
[45] Date of Patent: Mar. 9, 1993

[54] CIRCUIT FOR SAVING BATTERY FOR USE IN A RADIO PAGING RECEIVER AND METHOD THEREOF

[75] Inventor: Jin-Hyun Son, Suwon, Rep. of Korea

[73] Assignee: Samsung Electronics Co., Ltd., Suwon, Rep. of Korea

[21] Appl. No.: 460,995

[22] Filed: Jan. 4, 1990

[30] Foreign Application Priority Data

May 31, 1989 [KR] Rep. of Korea .................. 1989-7300

[51] Int. Cl.⁵ ........................ H04Q 3/02; H04B 7/02; H04B 1/16
[52] U.S. Cl. .................................. 455/38.3; 455/343; 340/825.44
[58] Field of Search ................. 455/343, 38, 207, 314, 455/228, 38.1, 38.2, 38.3, 338; 340/825.44, 825.47, 825.21, 825.48

[56] References Cited

U.S. PATENT DOCUMENTS

| | | | |
|---|---|---|---|
| 4,479,125 | 10/1984 | Mori | 455/343 |
| 4,479,261 | 10/1984 | Oda et al. | 455/343 |
| 4,491,978 | 1/1985 | Nagata et al. | 455/343 |
| 4,506,386 | 3/1985 | Ichikawa et al. | 455/343 |
| 4,768,031 | 8/1988 | Mori et al. | 455/343 |
| 4,823,398 | 4/1989 | Hashimoto | 455/343 |
| 4,955,080 | 9/1990 | Wagai et al. | 455/343 |
| 5,027,428 | 6/1991 | Ishiguro et al. | 455/343 |

OTHER PUBLICATIONS

Carlson, Communication Systems: An Introduction to Signals and Noise in Electrical Communications 1986, McGraw-Hill Book Company, pp. 273-277.

Clarke et al., Communication Circuits: Analysis and Design, Sep. 1978, Addison Wesley Publishing Company, pp. 293-295.

Primary Examiner—Reinhard J. Eisenzopf
Assistant Examiner—Lisa Charouel
Attorney, Agent, or Firm—Robert E. Bushnell

[57] ABSTRACT

A circuit for saving battery power in a radio paging receiver having a process for supplying first and second power saving signals indicative of first and second ON and OFF power signals. A first radio-frequency section converts the received radio-frequency signals upon reception of the first ON power signal; a second radio-frequency section then filters and demodulates the output signals from the first radio-frequency section to provide demodulated signals having a first voltage upon reception of the second ON power. A waveform shaper shapes the waveform of the demodulated signals to provide digital signals to the processor upon reception of the second ON power signal; and a switch enables and disables transmission of the first and second ON and OFF power signals from a power source to the first and second radio-frequency sections and the waveform shaper upon reception of the first and second power saving signals.

20 Claims, 6 Drawing Sheets

CIRCUIT FOR SAVING BATTERY FOR USE IN A RADIO PAGING RECEIVER AND METHOD THEREOF

BACKGROUND OF THE INVENTION

The present invention relates to a radio paging receiver and, more particularly, to a circuit for minimizing a loss of data and for producing effective battery saving signals for use in a radio paging receiver.

Figure 1:
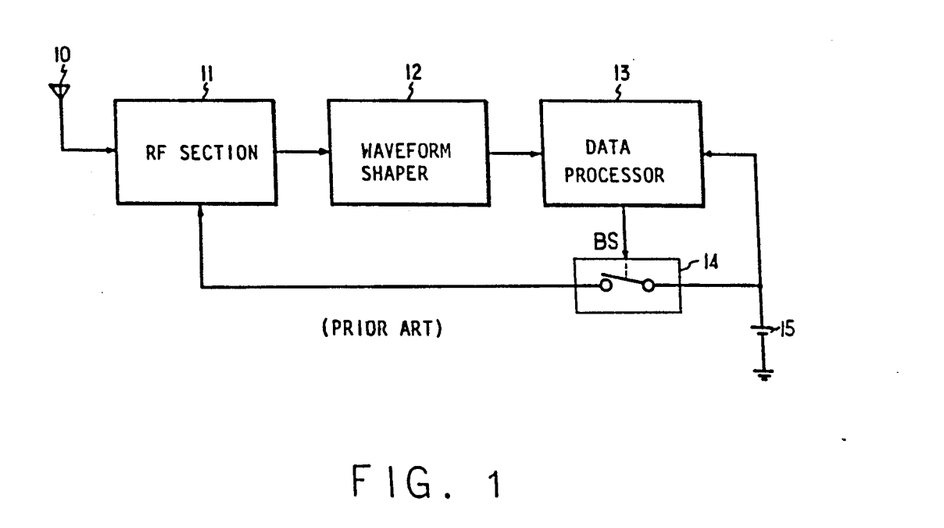
FIG. 1 is a structural view of a paging receiver which introduces a general battery saving system.

Generally, the paging receiver which introduces a battery saving system is structured as shown in FIG. 1. Referring to operation of the prior art system, radio frequency which is sent out from a sending station is applied to a radio frequency (RF) section 11 of a radio paging receiver through an antenna 10. By means of the RF section 11, the RF signals received through the antenna 10 is amplified and the frequency of the RF signal is converted by a general double-superheterodyne or homodyne receiving system. Thereafter the resultant signals are filtered and demodulated by a filter and a demodulator. Waveform shaper 12 converts the demodulated signals outputted from the RF section 11 into a digital signal by means of a filter and comparator because the demodulated signal is very weak and has high frequency noise therewith. Then, data processor 13 analyzes output of the waveform shaper 12 and controls various functions of the radio paging receiver.

In usual, the data processor 13 produces battery-saving-on (BSON) signals. Such BSON signals drive a switching circuit 14 thereby to control the supply of power 15 which is applied to the RF section 11 and to the waveform shaper 12 by way of the switching circuit 14.

Such a known method is generally employed in a compact battery-using receivers like a radio paging receiver in order to save the power consumption. The data processor 13 generates alternately battery-saving-on (logic high) and battery-saving-off (logic low) signals with regular intervals. If a preamble is received when battery-saving-on signal is generated, the BSON (battery-saving-on) signal is kept on being generated. While the switching circuit 14 is turned "on" the power 15 is supplied to the RF section 11 and the waveform shaper 12. The data processor 13 is thereby enabled to receive data.

Figure 2:
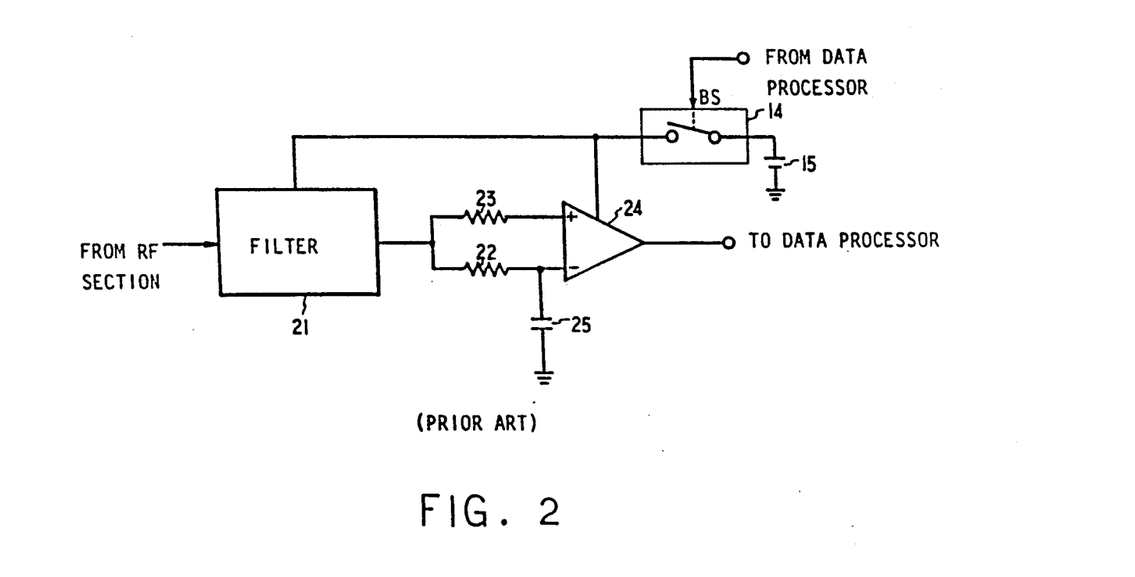
FIG. 2 is a detailed circuit diagram of waveform shaper in FIG. 1.

Regarding now a general waveform shaping process in reference to FIG. 2, the demodulated signal which is outputted from the RF section 11 is cleared of high frequency noise by means of a filter 21. The filter 21 is comprised of a low pass filter to remove high frequency noise, the low pass filter having passive elements such as resistance and capacitance. The demodulated signals which get through the filter 21 are converted into digital signals by means of the comparator 24 and thereafter applied to the data processor 13. In other words, the demodulated signals are applied to the non-inverting terminal of comparator 24 through resistance 23 and a part of the demodulated signals are integrated by integrator comprised of resistor 22 and capacitor 25 to be applied to the inverting terminal of comparator 24. Thus, the comparator 24 converts the demodulated signals into digital signals by comparing the voltage level of the integrated signals which are applied to the inverting terminal as reference voltage with the voltage level of demodulated signals which are applied to the non-inverting terminal in form of analog signal.

Figure 3:
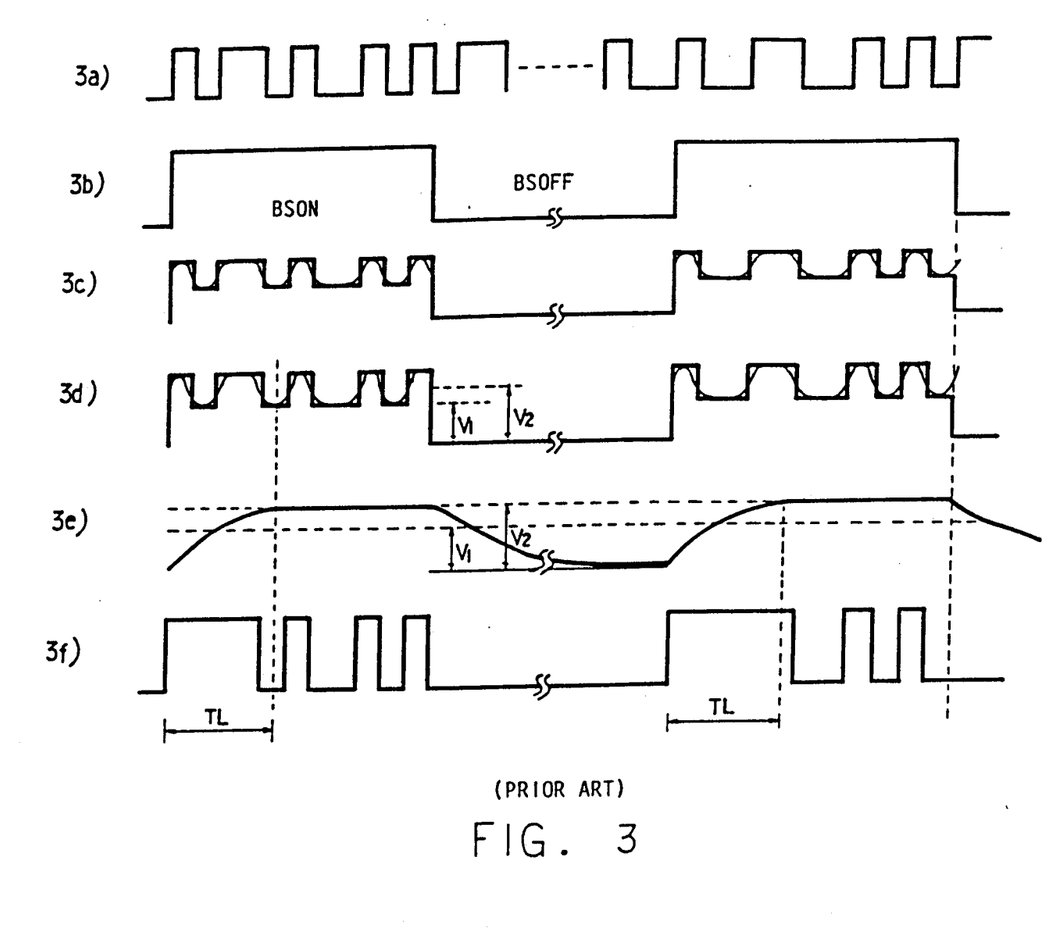
FIG. 3 is a view showing waveforms of each operating portion in FIG. 2.

The concrete operational waveforms of the waveform shaper 12 is illustrated in FIG. 3. The moment BSON signal as shown at 3b is generated by the data processor 13, the power 15 is supplied to the RF section 11 and the waveform shaper 12, and the filter 21 then generates a demodulated signal which is filtered like 3c. Then, output of the filter 21 is applied to the non-inverting terminal of the comparator 24 like 3d through the resistor 23. The output of the filter 21 is also applied to the inverting terminal of comparator 24 like 3e after being integrated by the integrator comprised of the resistor 22 and capacitor 25.

However, the input voltage applied to the inverting terminal as a reference voltage of the comparator 24 reaches to the reference voltage V2 only when time TL passes by the time constant of the resistor 22 and capacitor 25, as shown at 3e after the power 15 is applied. Consequently, there arises a problem that the radio paging receiver loses input data as shown in during the time TL among the received data of 3a.

To solve such a problem as stated above, a method disclosed in the U.S. Pat. No. 4,479,261 includes a first switching circuit and a second switching circuit. The battery is supplied to the waveform shaper 12 through the first switching circuit and to the RF section 11 through the second switching circuit. In the U.S. patent, the delay time TL is determined in advance by the time constant of capacitor 25 and the resistance 22, which generates the reference voltage which is applied to the inverting terminal of the comparator 24. When the BSON signal is generated to receive data, the power 15 is supplied to the waveform shaper 12 by driving the first switching circuit so as to make compensation for the delay time TL first and the power 15 is supplied to the RF section 11 by driving the second switching circuit after the time TL is delayed.

However, such a method requires more power supply to the waveform shaper 12 during the TL period every time the BSON signal is generated in order to ascertain if data is received, thereby causing power consumption to rise in a compact radio paging receiver.

BRIEF DESCRIPTION OF THE DRAWINGS

For a better understanding of the invention and to show how the same may be carried into effect, reference will now be made, by way of example, to the accompanying diagrammatic drawings, in which.

SUMMARY OF THE INVENTION

Accordingly, an object of the present invention is to provide a circuit and a method for saving battery, by which power consumption is curtailed without a loss of data when a demodulated signal is converted into a digital signal in a paging receiver which introduces a power saving system.

Another object of the present invention is to provide a circuit and a method capable of receiving data in a stabilized way by quickly charging the reference voltage when a battery-saving-on signal is generated and by extending discharging time to the highest degree when a battery-saving-off signal is generated.

Still another object of the present invention is to provide a method capable of receiving data in a stabilized way when a next battery-saving-on signal is generated, by extending a predetermined period of battery-saving-on signal which is applied to the waveform shaper when bit numbers of logic "low" data received are greater than a predetermined bit numbers.

According to one aspect of the present invention to accomplish above objects, the radio paging receiver includes: a first RF section which amplifies a received radio frequency and converts its frequency by being driven when a first BSON signal is generated, a second RF section which, filters output of the first RF section into a predetermined frequency band, demodulates the signal filtered and loads the demodulated signal on a first voltage and outputs it by being driven when a second battery-saving-on signal is generated, a waveform shaper which, quickly charges the reference voltage to the second voltage when the second battery saving signal is generated, converts output of the second RF section into a digital signal and keeps the reference voltage above the first voltage by cutting off a discharge path of the reference voltage when the second battery-saving-off signal is generated. A data processor which generates the first and the second battery-saving-on signals which have a regular interval, keeps the first and the second battery-saving-on signals when the signal converted into a digital signal is received and the received data processed, a first switching circuit which supplies the first RF section with power by being turned "on" when the first battery-saving-on signal BSON1 is generated, and a second switching circuit which supplies the second RF section and the waveform shaper with power by being turned "on" when the second battery-saving signal is generated.

According to another aspect of the invention, the method for saving battery of a radio paging receiver comprises: a step for generating a first battery saving signal and a second battery saving signal at the same time and preparing for receiving data, a step for counting bit numbers of logic "low" data predetermined bits before a battery-saving off signal is generated, a step for, when the counted bit numbers are smaller than the predetermined value, generates the first and second battery-saving-off signals, and a step for generating the first battery-saving-off signal when the counted bit numbers are greater than the predetermined value and, after delaying the second battery-saving-on signal to the extent of predetermined period, generating the second battery-saving-off signal.

DETAILED DESCRIPTION OF THE PREFERRED EMBODIMENTS

An embodiment of the present invention will now be described hereinbelow with reference to the drawings attached hereto.

Figure 4:
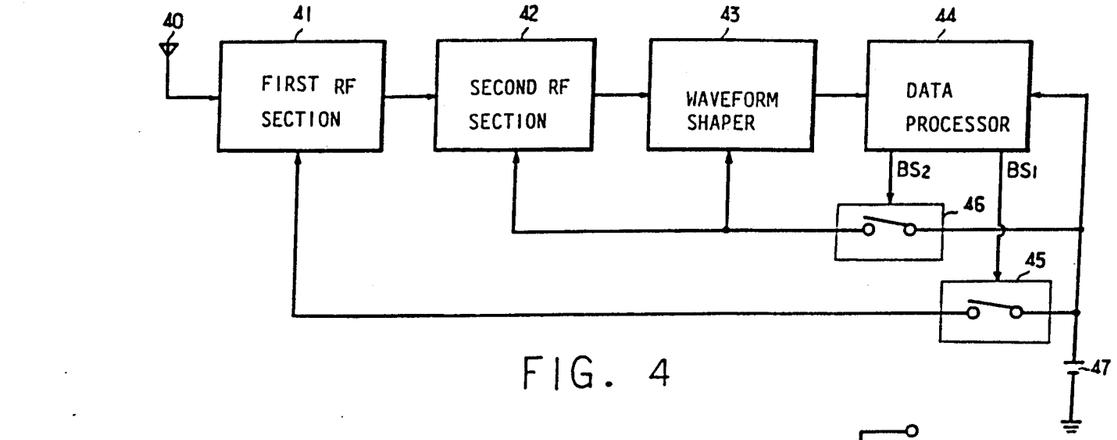
FIG. 4 is a structural view of a paging receiver according to the present invention.

Referring to FIG. 4, there is shown a block diagram of a paging receiver according to the invention, in which a first RF section 41 amplifies the received radio frequency and converts the frequency by being driven when a first battery saving-on signal BSON1 is generated. A second RF section 42 filters the output of the first RF section 41 into a prescribed frequency band and demodulates it and loads the demodulated signal on a given first voltage V1 to output by being driven when a second battery saving-on signal BSON2 is generated. A waveform shaper 43 quickly charges the reference voltage to a second voltage V2 when the BSON2 signal is generated and converts the output of the second RF section 42 into a digital signal and keeps the reference voltage over the first voltage V1 by cutting-off the discharging path of the reference voltage when the second battery-saving-off (BSOFF2) signal is generated. Then, a data processor 44 generates the BSON1 signal and BSON2 signal which have an same cycle at regular intervals and keeps the BSON1 signal and BSON2 signal being generated when the signal converted into a digital signal is received, thereby processing the received data. A first switching circuit 45 supplies with power of the battery 47 to the first RF section 41 by being turned "on" when the BSON1 signal is generated. A second switching circuit 46 supplies with power of the battery 47 to the second RF section 42 and to the waveform shaper 43 by being turned "on" when the BSON2 signal is generated.

Figure 5:
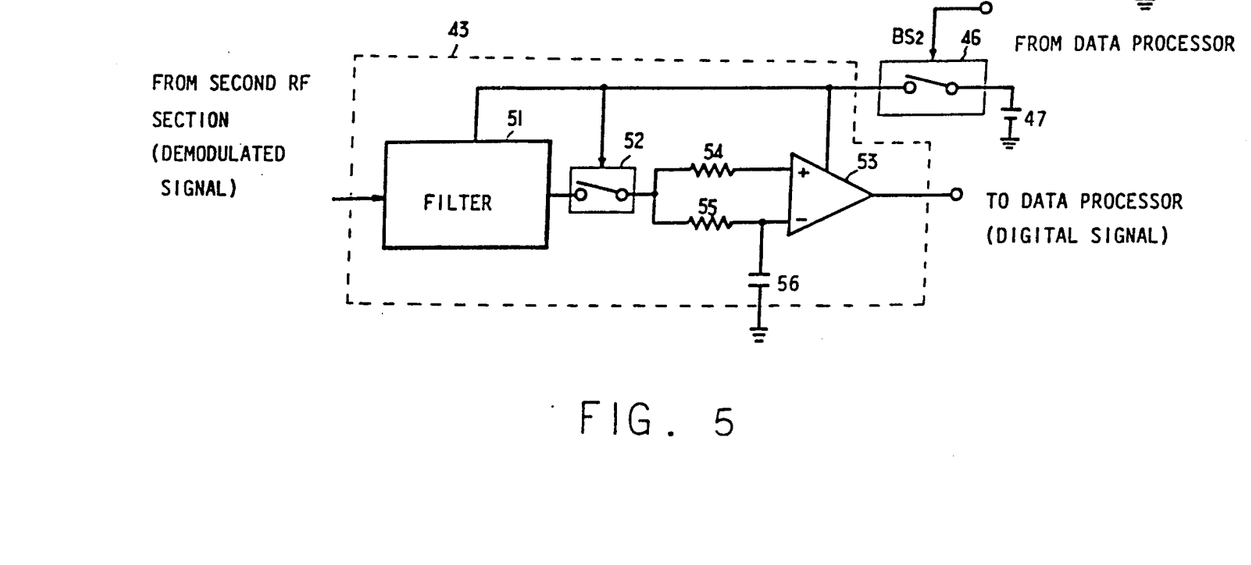
FIG. 5 is a detailed circuit diagram of waveform shaper in FIG. 4 according to the invention.
Figure 6:
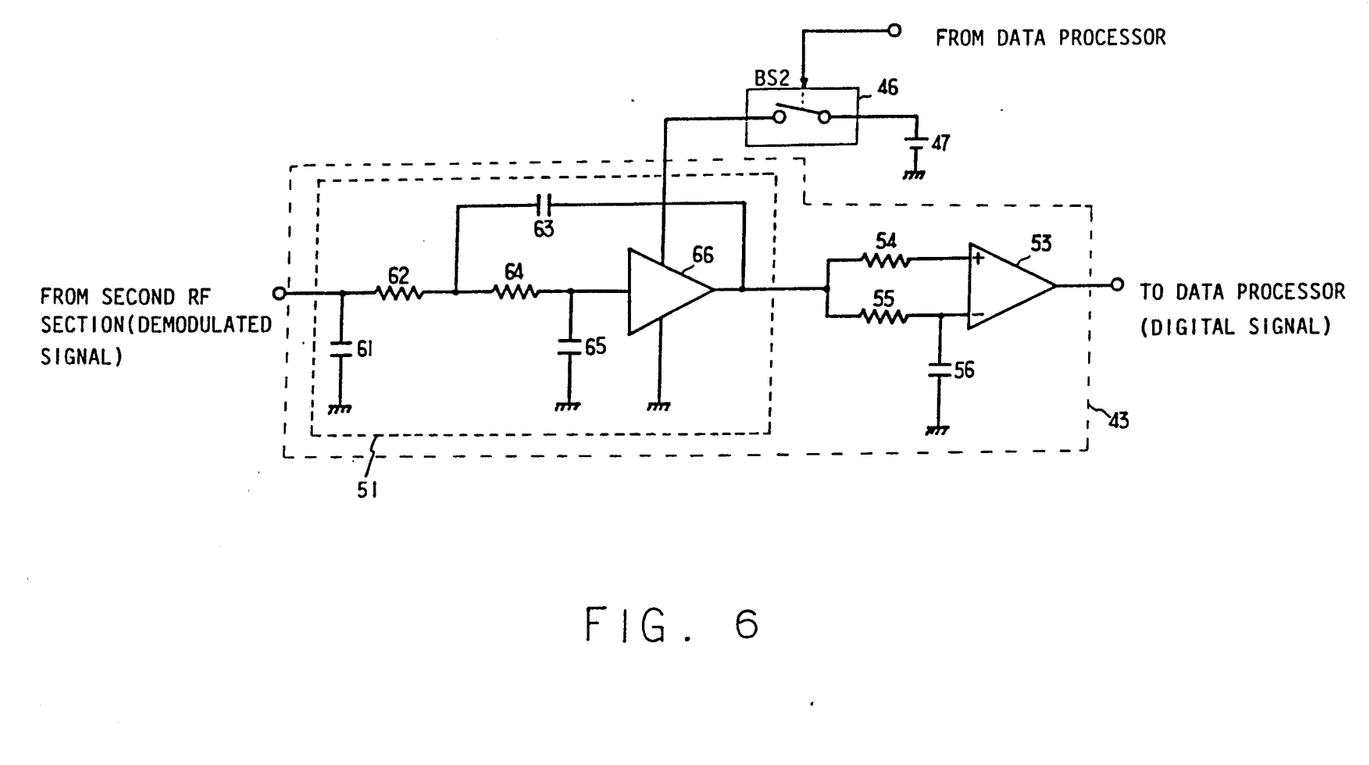
FIG. 6 is a detailed circuit diagram of the waveform shaper showing specifically a filter adopted thereto.

Now referring to FIG. 5 and 6, there is shown an embodiment of the waveform shaper 43 in which the discharge path is cut off to speedily charge the reference voltage to the second voltage V2 when the BSON1 signal is generated and to keep the reference voltage over the first voltage V1 when the BSOFF2 signal is generated. In FIG. 5, a filter 51 filters high frequency noises of the demodulated signals inputted, the high frequency noises being loaded on the first voltage V1. A switching circuit 52 forms the output path to the filter 51 by being turned "on" when the BSON2 signal is generated and cuts off the discharge path of the reference voltage by being turned "off" when BSOFF2 signal is generated. Thereafter, an integral circuit including a resistance 55 and a capacitor 56, when the switching circuit 52 is turned "on", generates the reference voltage which is equal to the second voltage V2 quickly charged to the output of the filter 51 and, when the switching circuit 52 is turned "off", keeps the reference voltage higher than the first voltage V1 as the discharging path is cut off by the switching circuit 52, and a comparator 53 converts the output of the filter 51 into a digital signal by taking into account the output of said integral circuit as a reference voltage.

FIG. 6 shows an embodiment which is carried out through a filter 51 which forms the function of switching circuit 52 by means of active elements. A filter 51 is composed of capacitors 61, 63, 65, resistors 62, 64 and an operational amplifier 66 to remove high frequency noise contained in the demodulated signal. The high frequency noises is loaded on the first voltage V1 to have high impedance when the BSOFF2 signal is generated.

The integral circuit, composed of a resistor 55 and a capacitor 56 generates the reference voltage which is equal to the second voltage V2 quickly charged to the output of the filter 51 when the switching circuit 52 is turned "on" and keeps the reference voltage higher than the first voltage V1, as the discharge path is cut off by the high impedance of the filter 51 when the switching circuit 52 is turned "off", and a comparator 53 converts output of the filter 51 into a digital signal by making a comparison therebetween with the output of said integral means as a reference voltage.

Figure 7:
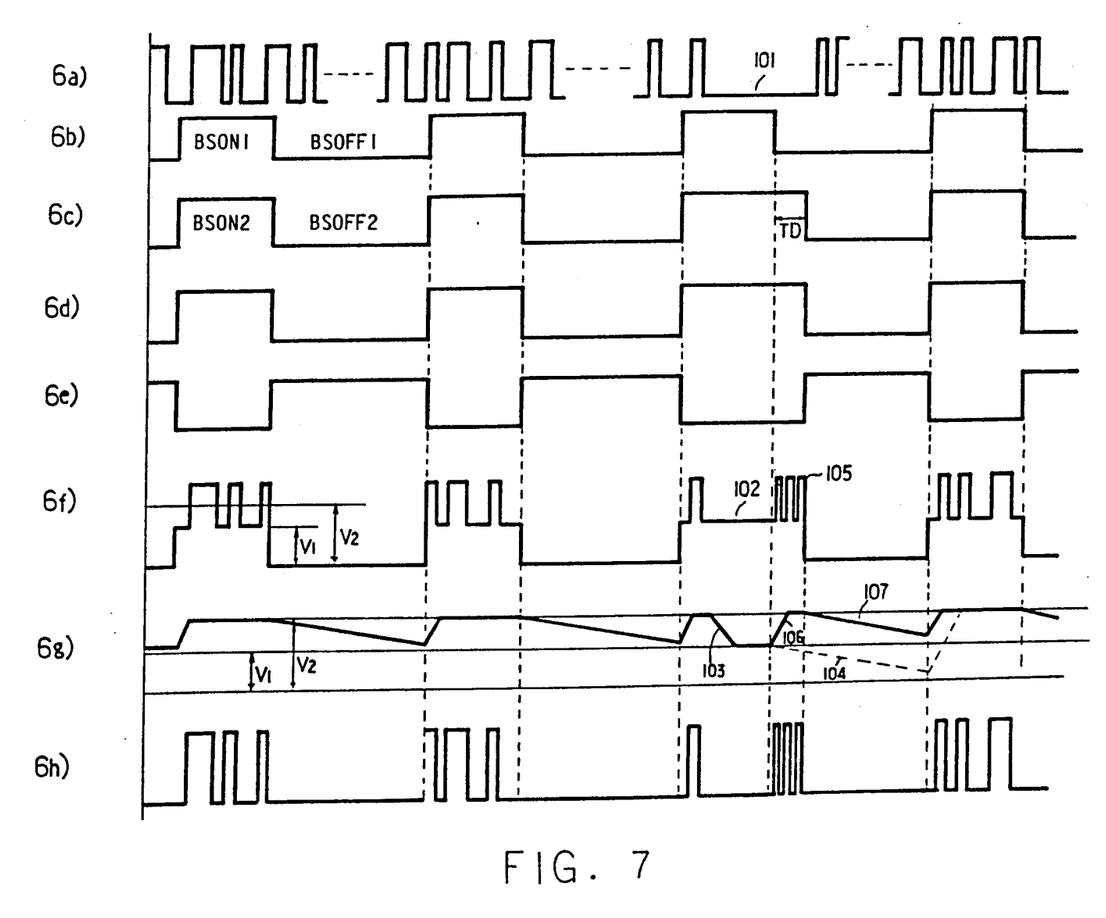
FIG. 7 is a view showing waveforms of each operating portion in FIG. 5 and 6, according to the invention.

Referring to FIG. 7, it illustrates a waveform shaping process in which the reference voltage is quickly charged to the second voltage V2 when battery saving signals BSON1, BSON2 (logic high) are generated; and waveforms are shaped without loss of data by keeping the reference voltage higher than the first voltage V1 when the battery saving signals BSOFF1, BSOFF2 (logic low) are generated.

Figure 8:
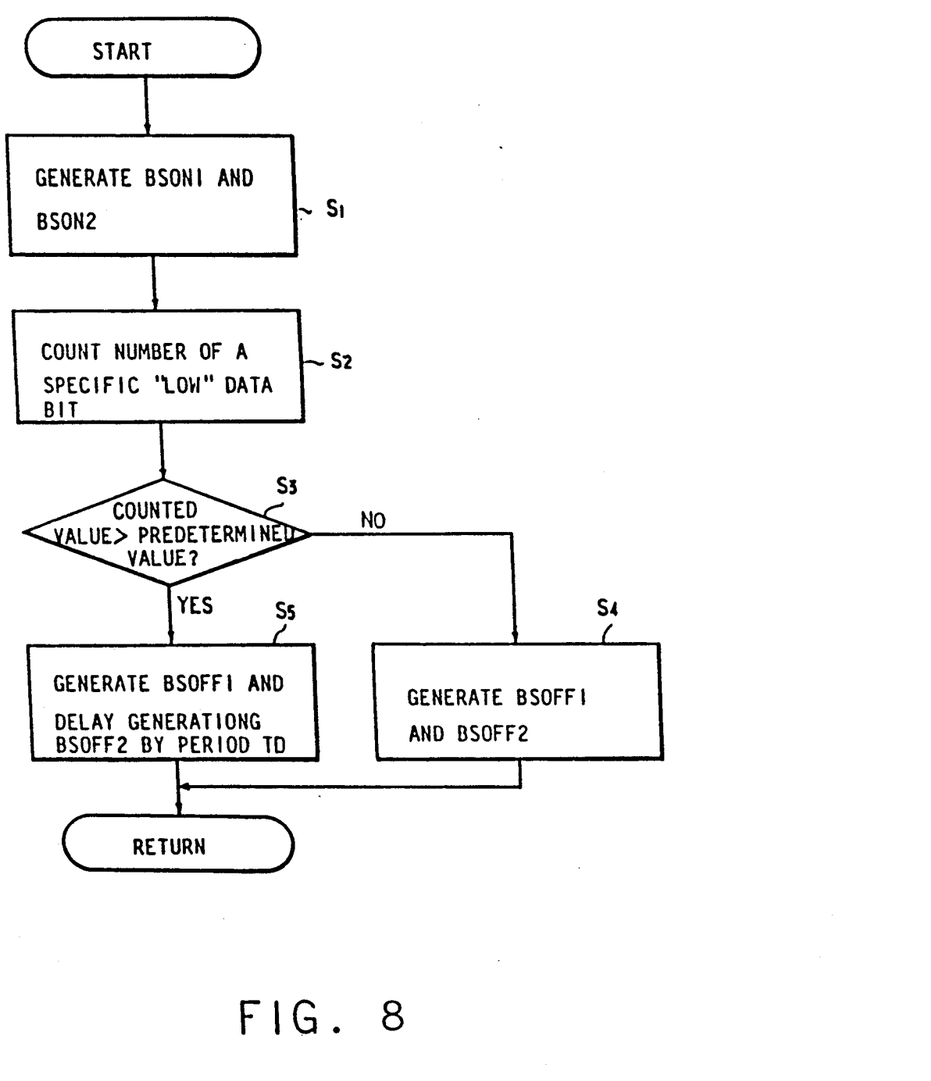
FIG. 8 is a flowchart of battery saving circuit control according to the present invention.

Referring to FIG. 8, it is a flowchart showing the generation of battery saving signals in accordance with the present invention. The flowchart is divided into several steps of: generating a first and second battery saving signals at the same time and making preparations for received data; counting the bits of "low" data before a predetermined bit to generate the battery saving signals BSOFF1, BSOFF2; changing the first and second battery saving signals BSON1, BSON2 to a logic "low" state simultaneously when the bit numbers counted at the above counting step are smaller than that of a predetermined value, which is regarded as the reference voltage is higher than the first voltage V1; recognizing the reference voltage as less than the first voltage V1 and generating the BSOFF1 signal when the counted "low" data bit is greater than the specified value and, after delaying the second battery saving-on signal BSON2 to the extent of required period, generating the BSOFF2 signal.

According to the embodiment on the basis of the structure as described hereinabove, the radio frequency which gets through the antenna 40 is demodulated through a decoder after amplified and converted to high frequency in the first RF section 41 and then filtered and amplified to a predetermined frequency channel in the second RF section 42. In this case, the radio frequency is about 900 MHz; and the first RF section 41 amplifies and converts this signal. As the frequency is high, a double super heterodyne receiver is usually used for the frequency conversion. The filter used in the second RF section 42 is a channel filter of the radio paging receiver and the amplifier is a main amplifier of the receiver, having a high gain. It is also used as a FM limiter.

The waveform shaper 43 which receives the demodulated signal of said second RF section 42 converts it into a digital signal so as to be sensed by the data processor 44 and gives an alarm to the data processor 44 by analyzing the received data and processes such a condition for display.

Such a radio paging receiver uses a designated battery and so it employs a battery saving method. The data processor 44 generates BSON1 and BSON2 signals at regular intervals to ascertain if data is received.

The BSON1 signal supplies a power source 47 to the first RF section 41 by turning the first switching circuit 45 on and the BSON2 signal supplies a power source 47 to the second RF section 42 and to the waveform shaper 43 by turning the second switching circuit 46 on. As data is lost by the time constant of charging and discharging when the BSON2 signal generates reference voltage in the waveform shaper 43, the present invention forms the waveform shaper 43 as illustrated in FIG. 5. When the BSON1 signal is generated, reference voltage is quickly charged to the second voltage V2 by lowering the capacitor's 56 time constant of charging and discharging and, when the BSOFF2 is generated, reference voltage is kept, until the next period, over the first voltage V1 by raising the time constant of charging and discharging to a considerable degree.

If operations are conducted in such a manner, data will not be lost even when the period of BSON1 and BSON2 signals is made identical.

Giving an explanation of the above operations with reference to FIG. 6, the data processor 44 generates a first and second battery saving signals BS1 and BS2 like 6b and 6c at regular intervals and those signals operate the first and second RF sections 41, 42 and the waveform shaper 43. As the switching circuit 52 turns on when the BSON2 signal is generated, the demodulated signal which is outputted from the second RF section 42 is cleared of high frequency noises through the filter 51 and applied to the comparator 53. The time constant of charging the reference voltage of comparator 53 at this time is determined by the output resistance of filter 51, resistance 55 and capacitor 56 and the reference voltage of comparator 53. Thus, the reference voltage of comparator 53 is quickly charged to the capacitor 56 by the second voltage V2 which is the medium value of demodulated signal outputted from the filter 51 like 6g.

As the input resistance of comparator 53 is very high, it produces little or no effect on the charge and discharge. Therefore, the comparator 53 generates a digital signal like 6h without a loss of data by comparing the filtered demodulated signal like 6f which is applied to the non-inversing terminal through resistance 54 and the reference voltage in the state of second voltage V2 like 6g which is generated through resistance 55 and capacitor 56.

If the BSOFF2 signal is generated thereafter, the switching circuit 46 also turns off and, as the discharge path of capacitor 56 is thereby cut off, reference voltage discharges slowly to the first voltage V1 condition like 6g and maintains higher than the first voltage V1 condition until the next BSON2 signal is generated. It is due to a leakage current that the reference voltage discharges little by little from the second voltage V2. As the reference voltage is maintained above the first voltage V1 when the next BSON signals are generated, it rises to the second voltage V2 in a short time and so the comparator 53 converts the demodulated signal which is outputted from the filter 51 without a loss of data.

Hence, function of the switching circuit 52 can be easily realized if an active filter is used. FIG. 6 is an embodiment in which the switching circuit 52 fulfills its function by means of an active filter 60. When a demodulated signal is generated in the second RF section 42, the filter 60 operates and, after removal of high frequency noises contained in the demodulated signals, applies it to the non-inversing and inversing terminals of comparator 53. At this time, the resistance 55 and the capacitor 56 are identical with the function of the like in FIG. 5.

When the BSON2 signal is generated, the voltage to capacitor 56 is quickly charged up to the second voltage V2 by the demodulated signal which passed through the active filter 51 and the comparator 53 converts into a digital signal the demodulated signal which is inputted with this charge as a reference signal. If the BSOFF2 signal is generated at that time, the operational amplifier 66 of active filter 50 attains to high impedance and cuts off the discharging path of the reference voltage charged into the capacitor 56. So, the reference voltage keeps higher than the first voltage V1 until the next BSON2 signal is generated.

On the other hand, in case "low" data is sent out continuously like 101 of 6a from the sending station, the demodulated signal which is outputted from the filter 51 attains to low level like 6f. As the output of said filter 51 generates the output of first voltage V1 at this time, the reference voltage charged to the capacitor 56 drops to the first voltage V1 like 103 by the output like 102 from the second voltage condition. If the BSOFF2 signal is generated thereafter, the discharging path of the capacitor 56 is cut off, but the reference voltage begins to discharge slowly by a leakage current and drops below the first voltage V1 as it is in the state of the first voltage V1.

To prevent such a drop, method presented as in FIG. 8 is used. First of all, the data processor 44 attains to operating condition as the power source 47 is supplied to the first and second RF sections 41, 42 and to the waveform shaper 43 when BSON1 and BSON2 signals are generated at regular intervals in stage S1. Accordingly, when a demodulated signal is generated in the second RF section 42, the waveform shaper 43 converts it into a digital signal and applies it to the data processor 44. At this time, the data processor 44 counts in stage S2 "low" bit data numbers from a required bit (n-bits) before BSOFF2 is generated.

In stage S3 where the BSOFF2 signal is generated, it is checked if the number of counted "low" bit data is greater than a predetermined value. When it is less than the predetermined value, the system proceeds to stage S4 as the charging voltage of the capacitor 56 is in the state of keeping the second voltage V2, and the data processor 44 generates BSOFF1 and BSOFF2 and then returns.

If, however, the number of "low" bit data is greater than the predetermined value, it proceeds to stage S5 and generates the BSOFF1 signal. The BSOFF2 signal is generated after the lapse of time TD like 6c. Then, the first RF section 41 does not operated and noise signals are caused in the input of the second RF section 42. As those noise signals contain various frequency components, the second RF section 42 extracts from those noise signals a noise signal within the channel which is detected in the channel filter and amplifies it through an amplifier and the amplified signal operates as unmodulated quasi carrier signals (carrier) in the demodulator. Accordingly, a noise signal is detected in the output of the second RF section 42 and this signal appears like 105 of 6f through the filter 51. Thus, the resistance 55 and the capacitor 56 are quickly charged to the second voltage condition like 106 and do not drop below the first voltage V1 like 107 until the next BSON2 signal is generated.

In case the data code format is a Post Office Committee Standard Association Group (POCSAG) code of 512 bps, if the preamble is 576 bits, the battery saving signal BS in the preamble search mode is "high" for a period of 64 bits and is "low" for a period of 512 bits. When a preamble is detected in the above, the BS signal is generated for a period of double frames before or after its own frame in the address search mode for detecting its own specific frame. As one frame comprises 64 bits, the BS signal is generated for a period of 128 bits. If the capacitor 56 is 3.3 μF, discharge resistance RD is 12 MΩ and resistance 55 is 150 KΩ, n-bit which is to count "low" data before BSOFF1 signal is generated in the stage S2 attains to 32 bits and, if the stipulated number of bits A in the 32 bits counted "low" data more than 28 bits in the stage S3, BS2 signal is outputted in the stage S5 by delaying it to the extent of 78 ms (about 40 bits: TD period). The above value is flexible depending on the code format, transmission speed, and the time constant of capacitor 56 and the resistance 55.

However, it is very seldom that "low" bit data is received continuously and that BS2 signal is extended as stated above. As the preamble signal is a reverse data 101010 . . . in the preamble search mode, continuous "low" bit data is not generated. In the case of POCSAG code, transmission probability of continuous "low" bit data is very small. However, as the first RF section 41 has very weak radio frequency signal at 900 MHz, the radio paging receiver must amplify the received signal by means of a low noise amplifier and then convert its frequency. So it consumes a large amount of electric power. However, as the second RF section 42 and the waveform shaper 43 consume a small amount of electric power, its overall power consumption is very small even if BS2 signal is extended by the period TD.

As heretofore described, the present invention is advantageous in that it is not necessary to supply a separate power source for preventing a loss of data by generating the BSON1 and BSON2 signals simultaneously with a same interval, while preventing a loss of data, in a radio paging receiver which employs such a battery saving method as described hereinbefore.

While the invention has been particularly shown and described with reference to a preferred embodiment, it will be understood by those skilled in the art that modifications in detail may be made without departing from the spirit and scope of the invention.

What is claimed is:

1. A circuit for saving battery power in a radio paging receiver having first and second radio frequency sections, said circuit generating a first battery saving signal and a second battery saving signal, comprising:

waveform shaping means, coupled to receive said second battery saving signal, for charging a reference voltage to a level of a second voltage, converting output of said second radio frequency section into a digital signal, and cutting off a discharging path of said reference voltage for maintaining said reference voltage at a level of a first voltage;

means for generating said first battery saving signal and said second battery saving signal, and for processing data received from the output of said second radio frequency section, said first battery saving signal and said second battery saving signal being held in a specified state in accordance with the digital signal received from said waveform shaping means;

means for providing the first radio frequency section with power on a basis of said first battery saving signal; and means for providing the second radio frequency section and said waveform shaping means with power on a basis of said second battery saving signal.

2. The circuit as claimed in claim 1, wherein said waveform shaping means comprises:

means for filtering high frequency noises of the output signal received from said second radio frequency section, said output signal having said first voltage;

means for operating a current path of said filtering means on a basis of said second battery saving signal;

integral means for generating said reference voltage at the level of said second voltage and for holding said reference voltage by cutting off said discharging path, on a basis of said means for opening said current path; and means for converting the output signal of said filtering means into a digital signal, on a basis of the reference voltage of said integral generating means.

3. The circuit as claimed in claim 1, wherein said second voltage is substantially higher than said first voltage.

4. The circuit as claimed in claim 2, wherein said reference voltage at the level of said second voltage generated from said integral means is a medium value of the output signal received from the filtering means.

5. The circuit as recited in claim 1, wherein said power providing means is one of an active and passive switches.

6. A method of saving batteries for use in a radio paging receiver, comprising the steps of:

generating a first battery saving signal and a second battery saving signal at a same time;

counting a number of data bits of a specific logic level to a given value;

cutting off said first battery saving signal and said second battery saving signal at a same time, when the number of said data bits counted is smaller than a given value; and cutting off said first battery saving signal and then, with a given time delay, cutting off said second battery saving signal, when the number of said data bits connected is greater than the given value.

7. A circuit for saving battery power in a radio paging receiver having processor means for supplying first and second power saving signals indicative of first and second ON and OFF power signals, said circuit comprising:

a first radio-frequency section for receiving radio-frequency signals, and converting said radio-frequency signals into first output signals upon reception of said first ON power signal;

a second radio-frequency section for filtering said first output signals, and demodulating said output signals to provide demodulated signals having a first voltage upon reception of said second ON power signal;

waveform shaper means for shaping the waveform of said demodulated signals to provide digital signals to said processor means upon reception of said second ON power signal; and switch means for enabling and disabling transmission of said first and second ON and OFF power signals from a power source to said first and second radio-frequency sections and said waveform shaper means upon reception of said first and second power saving signals.

8. A circuit for saving battery power as claimed in claim 7, wherein said processor means comprises:

means for generating said first and second power saving signals for enabling transmission of said first and second ON power signals from said power source to said first, second radio-frequency sections and said waveform shaper means intermittently in a prescribed cycle for ascertaining whether a preamble signal having a predetermined number of bits in a period is present in the demodulated signals; and means for generating said first and second power saving signals for enabling transmission of said first and second ON power signals continuously for a prescribe period of time if said preamble signal is present in said demodulated signals.

9. A circuit for saving battery power as claimed in claim 8, wherein said waveform shaper means comprises:

filter means for receiving said demodulated signals and filtering said demodulated signals to provide filtered signals having said first voltage upon reception of said second ON power signal;

integral circuit means having a predetermined time constant for charging a reference voltage to a second voltage;

voltage comparator means for comparing said filtered signals having said first voltage with said reference voltage having said second voltage to provide digital signals; and second switch means for enabling transmission of said filtered signals having said first voltage to said integral circuit means and said voltage comparator means upon reception of said second ON power signal, and disabling transmission of said filtered signals having said first voltage to said integral circuit means and said voltage comparator means upon reception of said second OFF power signal.

10. A circuit for saving battery power as claimed in claim 8, wherein said waveform shaper means comprises:

filter means for receiving said demodulated signals and filtering said demodulated signals to provide filtered signals, said filter means enabling transmission of said filtered signals having said first voltage upon reception of said second ON power signal, and disabling transmission of said filtered signals having said first voltage upon reception of said second OFF power signal;

integral circuit means having a predetermined time constant for changing a reference voltage to a second voltage; and voltage comparator means for comparing said filtered signals having said first voltage with said reference voltage having said second voltage to provide digital signals.

11. A circuit for saving battery power as claimed in claim 9, wherein said second voltage is substantially higher than said first voltage.

12. A circuit for saving battery power as claimed in claim 11, wherein said second switch means further serves as a cut-off discharge path of said reference voltage upon reception of said second OFF power signal for maintaining said reference voltage higher than said first voltage until a next reception of said second ON power signal.

13. A circuit for saving battery power as claimed in claim 10, wherein said second voltage is substantially higher than said first voltage.

14. A circuit for saving battery power as claimed in claim 13, wherein said filter means is an active filter having a high output impedance for serving as a cut off switch to hinder a discharge of said reference voltage upon reception of said second OFF power signal, and to maintain said reference voltage higher than said first voltage until a next reception of said second ON power signals.

15. A circuit for saving battery power as claimed in claim 7, wherein said demodulated signals comprise a Post Office Committee Standard Association Group code format having a preamble signal of 576 bits.

16. A circuit for saving battery power as claimed in claim 7, wherein said processor means generates said first and second power saving signals during a preamble search mode respectively representative of a high data bit mode and a low data bit mode, said processor means comprising:

means for generating said first and second power saving signals for enabling transmission of said first and second ON power signals from said power source to said first and second radio-frequency sections and said waveform shaper means intermittently in a prescribed cycle for ascertaining whether a preamble signal having a predetermined number of data bits in a period is present in the demodulated signals;

means for counting numbers of data bits of said preamble signal during said low data bit mode to provide a counted number of data bits for comparing with a predetermined value; and means for simulating generating said first and second power saving signals indicative of said first and second OFF power signals if said counted number of data bits is less than said predetermined value, and for generating said second power saving signal indicative of said second OFF power signal one delay period after generating said first power saving signal indicative of said first OFF power signal if said counted number of data bits is greater than said predetermined value.

17. A circuit for saving battery power as claimed in claim 16, wherein said waveform shaper means comprises:

filter means for receiving said demodulated signals and filtering said demodulated signals to provide filtered signals, said filter means enabling transmission of said filtered signals having said first voltage upon reception of said second ON power signal, and disabling transmission of said filtered signals having said first voltage upon reception of said second OFF power signal;

integral circuit means having a predetermined time constant for charging a reference voltage to a second voltage; and voltage comparator means for comparing said filtered signals having said first voltage with said reference voltage having said second voltage to provide digital signals.

18. A circuit for saving battery power as claimed in claim 17, wherein said second voltage is substantially higher than said first voltage.

19. A circuit for saving battery power as claimed in claim 18, wherein said filter means is an active filter having output impedance for hindering discharge of said reference voltage upon reception of said second OFF power signal, and maintaining said reference voltage higher than said first voltage until a next reception of said second ON power signal.

20. A circuit for saving battery power as claimed in claim 14, wherein said processor means for generating said first and second power saving signals during a preamble search mode respectively representative in a high data bit mode and a low data bit mode, said processor means generating said first and second power saving signals, comprising the steps of:

generating said first and second power saving signals for enabling transmission of said first and second ON power signals from said power source to said first, second radio-frequency sections and said waveform shaper means intermittently in a prescribed cycle for ascertaining whether a preamble signal having a predetermined number of bits in a period is present in the demodulated signals;

counting numbers of data bits of said preamble signal during said lower data bits mode to provide a counted number of data bits for comparing with a predetermined data bits value;

simultaneously generating said first and second power saving signals indicative of said first and second OFF power signals if said counted number of data bits is less than said predetermined data bits value, and for generating said second power saving signal indicative of said second OFF power signals one delay period after generating said first power saving signal indicative of said first OFF power signal if said counted number of data bits is greater than said predetermined data bits value.

* * * * *

UNITED STATES PATENT AND TRADEMARK OFFICE
CERTIFICATE OF CORRECTION

PATENT NO. : 5,193,212
DATED : 9 March 1993
INVENTOR(S) : Jin-Hyun SON

It is certified that error appears in the above-indentified patent and that said Letters Patent is hereby corrected as shown below:

| Claim 2,  | Column 8,  | Line 64, | change "operating" to --opening--; |
| Claim 16, | Column 11, | Line 20, | change "simulating" to --simultaneously--; |
| Claim 19, | Column 12, | Line 10, | insert --a high-- after "having"; |
| Claim 20, | Column 12, | Line 39, | change "signals" to --signal--. |

Signed and Sealed this

Nineteenth Day of April, 1994

Attest:

BRUCE LEHMAN

*Attesting Officer*    *Commissioner of Patents and Trademarks*